(12) United States Patent
Stern et al.

(10) Patent No.: US 6,778,986 B1
(45) Date of Patent: Aug. 17, 2004

(54) COMPUTER METHOD AND APPARATUS FOR DETERMINING SITE TYPE OF A WEB SITE

(75) Inventors: Jonathan Stern, Brookline, MA (US); Kosmas Karadimitriou, Shrewsbury, MA (US); Michel Decary, Montreal (CA); Jeremy W. Rothman-Shore, Cambridge, MA (US)

(73) Assignee: Eliyon Technologies Corporation, Cambridge, MA (US)

( * ) Notice: Subject to any disclaimer, the term of this patent is extended or adjusted under 35 U.S.C. 154(b) by 250 days.

(21) Appl. No.: 09/703,907

(22) Filed: Nov. 1, 2000

Related U.S. Application Data
(60) Provisional application No. 60/221,750, filed on Jul. 31, 2000.

(51) Int. Cl.$^7$ ............................................. G06F 17/30
(52) U.S. Cl. ................................ 707/10; 707/5; 707/6; 707/102; 706/31; 706/61; 709/203; 709/219
(58) Field of Search ......................... 707/3–6, 10, 102; 706/12, 15, 18, 20, 61, 31; 709/203, 219

(56) References Cited

U.S. PATENT DOCUMENTS

| | | | |
|---|---|---|---|
| 5,319,777 A | | 6/1994 | Perez ............................ 707/10 |
| 5,764,906 A | | 6/1998 | Edelstein et al. ............. 709/219 |
| 5,813,006 A | | 9/1998 | Polnerow et al. ............. 707/10 |
| 5,895,470 A | * | 4/1999 | Pirolli et al. ................. 707/102 |
| 5,918,236 A | * | 6/1999 | Wical ............................ 707/500 |
| 5,924,090 A | * | 7/1999 | Krellenstein .................... 707/5 |
| 6,094,653 A | * | 7/2000 | Li et al. ......................... 707/6 |
| 6,112,203 A | * | 8/2000 | Bharat et al. ................... 707/5 |
| 6,122,647 A | * | 9/2000 | Horowitz et al. ........... 707/513 |
| 6,253,198 B1 | | 6/2001 | Perkins |
| 6,260,033 B1 | * | 7/2001 | Tatsuoka ....................... 706/45 |
| 6,336,108 B1 | * | 1/2002 | Thiesson et al. .............. 706/20 |
| 6,349,309 B1 | * | 2/2002 | Aggarwal et al. ........... 707/200 |
| 6,418,432 B1 | * | 7/2002 | Cohen et al. .................... 707/5 |
| 6,618,717 B1 | * | 9/2003 | Karadimitriou et al. ....... 706/61 |
| 6,640,224 B1 | * | 10/2003 | Chakrabarti .................... 707/5 |

FOREIGN PATENT DOCUMENTS

| | | |
|---|---|---|
| AU | A-53031-98 | 8/1998 |
| JP | 10-320315 | 12/1998 |
| WO | WO 99/67728 | 12/1999 |
| WO | WO 00/33216 | 6/2000 |

OTHER PUBLICATIONS

ABCNEWS.com, Apr. 28, 1999. http://web.archive.org/web/1990428185649/abcnews.go.com/.*

COMPAQt, Apr. 22, 1999. http://web.archive.org/web/19990422222242/www.compaq.com/.*

Dwi H. Widyantoro, Thomas R. Ioerger, John Yen. "An Adaptive Algorithm for Learning Changes in User Interest". Nov. 1999. ACM. p 405–412.*

Soumen Chakrabarti, Byron Dom, Piotr Indyk. "Enhanced hypertext categorization using hyperlinks". 1998 ACM. pp. 307–318.*

Mehren Sahami, Salim Yusufali, Michelle Q. W. Baldonado. Mar. 1998. Digital Libraries ACM 1998. pp. 200–209.*

(List continued on next page.)

*Primary Examiner*—Jean R. Homere
(74) *Attorney, Agent, or Firm*—Hamilton, Brook, Smith & Reynolds, P.C.

(57) ABSTRACT

Computer method and apparatus identifies content owner of a Web site. A collecting step or element collects candidate names from the subject Web site. For each candidate name, a test module (or testing step) runs tests that provide quantitative/statistical evaluation of the candidate name being the content owner name of the subject Web site. The test results are combined mathematically, such as by a Bayesian network, into an indication of content owner name.

27 Claims, 4 Drawing Sheets

OTHER PUBLICATIONS

Nir Friedman, Moises Goldszmidt. "Building Classifiers using Bayesian Networks". From Proceedings of the National Conference on Artificial Intelligence (AAAI96). pp. 1277–1284.*

PCT International Search Report PCT/US01/22430, Jan. 17, 2003, 4 pp.

PCT International Search Report PCT/US01/22381, Feb. 12, 2003, 3 pp.

PCT International Search Report PCT/US01/24162, Feb. 13, 2003, 4 pp.

Ball, T. and F. Douglis, "An Internet Difference Engine and its Applications," *Proceedbings of COMPCON '96, IEEE Comp. Soc. Press*, Feb. 25, 1996, p. 71–76.

Freitag, D., "Machine Learning for Information Extraction in Informal Domains," *Machine Learning 39:2/3* (169–202), May/Jun. 2000, p. 169–202.

Kjell, B., "Authorship Attribution of Text Samples Using Neural Networks and Bayesian Classifiers," *IEEE Int. Conf. on Systems, Man, and Cybernetics*, vol. 2, Oct. 5, 1994, pp. 1660–1664.

Singhal, M., "Update Transport: A New Technique for Update Synchronization in Replicated Database Systems," *IEEE Transactions on Software Engineering 16:12* (1325–1336), Dec. 1, 1990.

PCT International Search Report PCT/US01/41515, Feb. 28, 2003, 4 pp.

Langer, A. and J.S. Rosenschein, "Using Distributed Problem Solving to Search the Web," *Proc. 4th Int. Conf. on Autonomous Agents, ACM, USA*, Jun. 3–7, 2000, pp. 197–198.

International Search Report PCT/US01/22426, Mar. 17, 2003, 4 pp.

International Search Report PCT/US01/23343, Mar. 19, 2003, 4 pp.

Guan, T. and K–F Wong, "KPS: a Web information mining algorithm," *Computer Networks 31:11–16* (1495–1507) May 17, 1999, Elsevier Science Publishers B.V., Amsterdam.

Miller, R.C. and K. Bharat, "SPHINX: a framework for creating personal, site specific Web crawlers," *Computer Networks and ISDN Systems*, 30:1–7 (119–130) Apr. 1, 1998, North Holland Publishing, Amsterdam.

Powell, T.A. et al., *HTML Programmer's Reference*, (*Appendices A and B*), Osborne/McGraw–Hill, 1998 (pp. 355–377).

Mitchell, T.M., "Bayesian Learning" in *Machine Learning*, McGraw–Hill (NY) 1997 (p. 154–200).

Domingos, P. and M. Pazzani,"On the Optimality of the Simple Bayesian Classifier under ZeroOne Loss," *Machine Learning, vol. 29*, 1997 (pp. 103–130).

Friedman, N. and M. Goldszmidt, "Building Classifiers Using Bayesian Networks," *Proceedings of the National Conference on Artificial Intelligence (AAAI 96)*, 1996 (pp. 1277–1284).

Lewis, D.D., "Naive (Bayes) at Forty: the Independence Assumption in Information Retrieval," *Proceedings 10th European Conference on Machine Learning (ECML–98)*, 1998 (p. 4–15).

Pazzani, M. et al., "Learning from hotlists and coldlists: Towards a WWW information filtering and seeking agent," *Proc. International Confernce on Tools with Artificial intelligence*, Los Alamitos, CA, 1994, pp. 492–495.

Lam, W. and K. Low, "Automatic Document Classification Based on Probabilistic Reasoning: Model and Performance Analysis," *1996 IEEE Conference on Computational Cybernetics and Simulation*, Orlando, FL 1997, pp. 2719–2723.

* cited by examiner

Preparation phase 1)

User defines the following:

13)
Web site types that the
method must recognize

News Site
Company Site
University Site
Hospital Site
Portal Site
Government Site Set of tests that provide
evidence about the site type     15)

T1 = "Number of external links > 50"
T2 = "Number of internal links > 50"
T3 = "Home page contains hospital
keywords (e.g. doctor, medical, etc)"
T4 = "Home page contains university
keywords (e.g. courses, research, etc)"
T5 = "Site contains video files"
T6 = "Site contains sound files"
T7 = "Site contains more than 100 pages"

…etc…

Fig. 1

COMPUTER METHOD AND APPARATUS FOR DETERMINING SITE TYPE OF A WEB SITE

RELATED APPLICATION

This application claims the benefit of Provisional Patent Application No. 60/221,750 filed Jul. 31, 2000, the entire teachings of which are incorporated herein by reference.

BACKGROUND OF THE INVENTION

Generally speaking a global computer network, e.g., the Internet, is formed of a plurality of computers coupled to a communication line for communicating with each other. Each computer is referred to as a network node. Some nodes serve as information bearing sites while other nodes provide connectivity between end users and the information bearing sites.

The explosive growth of the Internet makes it an essential component of every business, organization and institution strategy, and leads to massive amounts of information being placed in the public domain for people to read and explore. The type of information available ranges from information about companies and their products, services, activities, people and partners, to information about conferences, seminars, and exhibitions, to news sites, to information about universities, schools, colleges, museums and hospitals, to information about government organizations, their purpose, activities and people. The Internet has become the venue of choice for every organization for providing pertinent, detailed and timely information about themselves, their cause, services and activities.

The Internet essentially is the network infrastructure that connects geographically dispersed computer systems. Every such computer system may contain publicly available (shareable) data that are available to users connected to this network. However, until the early 1990's there was no uniform way or standard conventions for accessing this data. The users had to use a variety of techniques to connect to remote computers (e.g. telnet, ftp, etc) using passwords that were usually site-specific, and they had to know the exact directory and file name that contained the information they were looking for.

The World Wide Web (WWW or simply Web) was created in an effort to simplify and facilitate access to publicly available information from computer systems connected to the Internet. A set of conventions and standards were developed that enabled users to access every Web site (computer system connected to the Web) in the same uniform way, without the need to use special passwords or techniques. In addition, Web browsers became available that let users navigate easily through Web sites by simply clicking hyperlinks (words or sentences connected to some Web resource).

Today the Web contains more than one billion pages that are interconnected with each other and reside in computers all over the world (thus the term "World Wide Web"). The sheer size and explosive growth of the Web has created the need for tools and methods that can automatically search, index, access, extract and recombine information and knowledge that is publicly available from Web resources.

As used herein, the following terms have the indicated definitions.

Web Domain

Web domain is an Internet address that provides connection to a Web server (a computer system connected to the Internet that allows remote access to some of its contents).

URL

URL stands for Uniform Resource Locator. Generally, URLs have three parts: the first part describes the protocol used to access the content pointed to by the URL, the second contains the domain directory in which the content is located, and the third contains the file that stores the content:

<protocol>: <domain><directory><file>

For example:

http://www.corex.com/bios.html http://www.cardscan.com/index.html http://fn.cnn.com/archives/may99/pr37.html ftp://shiva.lin.com/soft/words.zip Commonly, the <protocol> part may be missing. In that case, modem Web browsers access the URL as if the http:// prefix was used. In addition, the <file> part may be missing. In that case, the convention calls for the file "index.html" to be fetched.

For example, the following are legal variations of the previous example URLs:

www.corex.com/bios.html www.cardscan.com fn.cnn.com/archives/may99/pr37.html ftp://shiva.lin.com/soft/words.zip 20 Web Page Web page is the content associated with a URL. In its simplest form, this content is static text, which is stored into a text file indicated by the URL. However, very often the content contains multi-media elements (e.g. images, audio, video, etc) as well as non-static text or other elements (e.g. news tickers, frames, scripts, streaming graphics, etc). Very often, more than one file forms a Web page, however, there is only one file that is associated with the URL and which initiates or guides the Web page generation.

Web Browser

Web browser is a software program that allows users to access the content stored in Web sites. Modem Web browsers can also create content "on the fly", according to instructions received from a Web site. This concept is commonly referred to as "dynamic page generation". In addition, browsers can commonly send information back to the Web site, thus enabling two-way communication of the user and the Web site.

There are many different types of Web sites, based on the type of content they publish, their purpose, or the type of owner (e.g. company, government, educational institution, etc). Identifying the type of a Web site is important for computer programs that traverse, index, or extract information from Web sites (e.g. search engines, Web data mining applications, etc). When the site type is known, these programs can selectively visit only the "useful" parts of the site, while skipping other parts, or even the whole site (e.g. Internet robots that search for company or people information may skip completely porn sites). In addition, the type of Web site is necessary for estimating the frequency of changes in its content, e.g. news sites may change their content daily, whereas organization sites less frequently, and personal sites (owned by individuals) even less frequently. Internet robots can implement appropriate schedules for visiting a site based on this estimate.

Furthermore, identifying the site type is very helpful in deducing the structure of the site. Broad categories of sites share the same meta-structure, for example, company sites usually have the following sections:

"About" section, with general information and description of the company

"Contact" section, with contact information

"Products/Services" section

"News" section, with press releases and news articles relevant to the company

"Employment opportunities" section, with a list of current job openings in the company whereas news sites usually include the following sections:

Current news

Local news

World news

Archives (archived news)

Business section (with business news)

Technology section (with technology news)

When the site type is identified, then this general meta-structure provides the blueprint for the expected actual site structure. This blueprint is a significant aid to Web software robots and data extraction tools that visit and extract information from Web sites.

SUMMARY OF THE INVENTION

The purpose of this invention is to automatically classify a Web site into an appropriate type. The potential types may vary, depending on the purpose of the classification. For example, when the purpose of classification is to determine visiting frequency for an Internet robot, then the set of potential types will be based on how frequent the site changes its contents, and may be the following:

{Daily, Weekly, Monthly, Bimonthly, Quarterly, Semiannually, Annually}

On the other hand, if the purpose of classification is to guide Internet robots into visiting certain sections of the site while avoiding others, then the set of potential site types may include the following:

{Company, News, Portal, Government, Hospital, University, Military, Personal}

This invention describes the general mechanism for classifying among any given set of potential types.

Examples of applications that benefit directly from automatic Web site classification are Inventions 5 and 6 as disclosed in the related Provisional Application No. 60/221,750 filed on Jul. 31, 2000 for a "Computer Database Method and Apparatus".

A preferred embodiment is a software program formed of a preparation phase, a training phase and a classification phase. During the preparation phase, the user defines the set of Web site types that the invention must recognize, and prepares tests that provide evidence about one or more of these types. During the training phase, the user runs all the tests on a set of Web sites with known site types. Then, the results of the tests are used to calculate statistical conditional probabilities of the form P(Test result|Hypothesis), i.e., the probability that a particular test result will appear for a particular test, given a particular hypothesis. The resulting table with probabilities can then be used for classification. The invention program runs the tests prepared in the preparation phase on a subject Web site with unknown site type and collects the test results. Then, the invention software combines the test results using the probabilities from the training phase and calculates a confidence level for each of the potential site types, as they have been identified during the preparation phase. Finally, the meta-structure of the site is derived based on the most probable site type.

In the preferred embodiment, potential site types include

News provider (e.g. on-line News, magazine, newspaper, newsletter, etc)

Specialized information provider (e.g. weather, traffic, movies, etc)

Company, for-profit organization

Educational institution (e.g. School, University, College, etc)

Medical organization (e.g. Hospital, Clinic, Health center, etc)

Law firm

Religious organization, church

Non-profit organization

Professional association

Political organization

City level local government

State level government

Government organization

Military

Retail, catalog

Portal, directory, search

Fan club of sports, music stars, movie stars

Sport team

Conference, symposium, workshop

Travel agency, airline

Sex

ISP (Internet Service Provider)

Gaming, sports, outdoors

Personal

Hotel, resort

Entertainment (theater, restaurant, bar, club, etc)

On-line entertainment (puzzles, jokes, chat rooms, on-line games, etc)

Reference (dictionaries, thesaurus, yellow pages, places, quotes, etc)

Job listings, classifieds

Event (festival, celebration, etc)

The tests employed in the preferred embodiment examine one or more of the following:

Text in the site's hyperlinks

Keywords in the site's URLs

Keywords in page titles

Keywords provided through the HTML <META> tag at the home page

Number of external links

Number of internal links

Distribution of internal and external links among pages

Vocabulary used in different parts of the site

Morphology of the site "tree" (number of levels, number of pages on each level, etc)

Morphology of the site's text content (number of headers, paragraphs, lists, tables, sentence length, format, etc)

Distribution of multimedia elements in the site (pictures, audio, video, graphics, etc)

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is an overview of the preparation phase for the present invention.

DETAILED DESCRIPTION OF THE INVENTION

Each Web site type tends to have a certain structure that can be identified automatically by a computer program. This structure can be revealed by examining the following:

Text in the site's hyperlinks
Keywords in the site's URLs
Keywords in page titles
Keywords provided through the HTML <META> tag at the home page
Number of external links
Number of internal links
Distribution of internal and external links among pages
Vocabulary used in different parts of the site
Morphology of the site "tree" (number of levels, number of pages on each level, etc)
Morphology of the site's text content (number of headers, paragraphs, lists, tables, sentence length, format, etc)
Distribution of multimedia elements in the site (pictures, audio, video, graphics, etc)
. . . etc . . .

For example, a site that belongs to a company is likely to contain many internal links, few external links, and many of the following keywords in the link text or URLs in the top levels of the site:

Company, About Us, Mission, Corporate, Strategy,
Management, Team, Executives, Leadership, Staff,
Products, Services, Offerings,
News, Press Releases,
Investor Relations, Financials,
Customers, Testimonials, Partners, Resellers, Distributors,
Technical Support, Customer Service,
Buy, Order, Ordering Information, Where to Buy, Sales On the other hand, a site that belongs to a university is likely to contain many internal and external links, and the following keywords in the text of its links or URLs:

Research, Laboratory, Library,
Faculty, Department, School, College,
Academic, Classes, Lectures, Courses,
Staff, Faculty, Professor,
Degrees, Certificates, Program
Graduation, Scores, Requirements,
Admissions, Registration,
Student, Alumni,
Facilities, Map These site properties are useful for distinguishing between different site types. The present invention describes a methodology to develop tests to examine these properties and then combine the test results to produce a confidence level on each predefined potential type for a given Web site.

Figure 2:
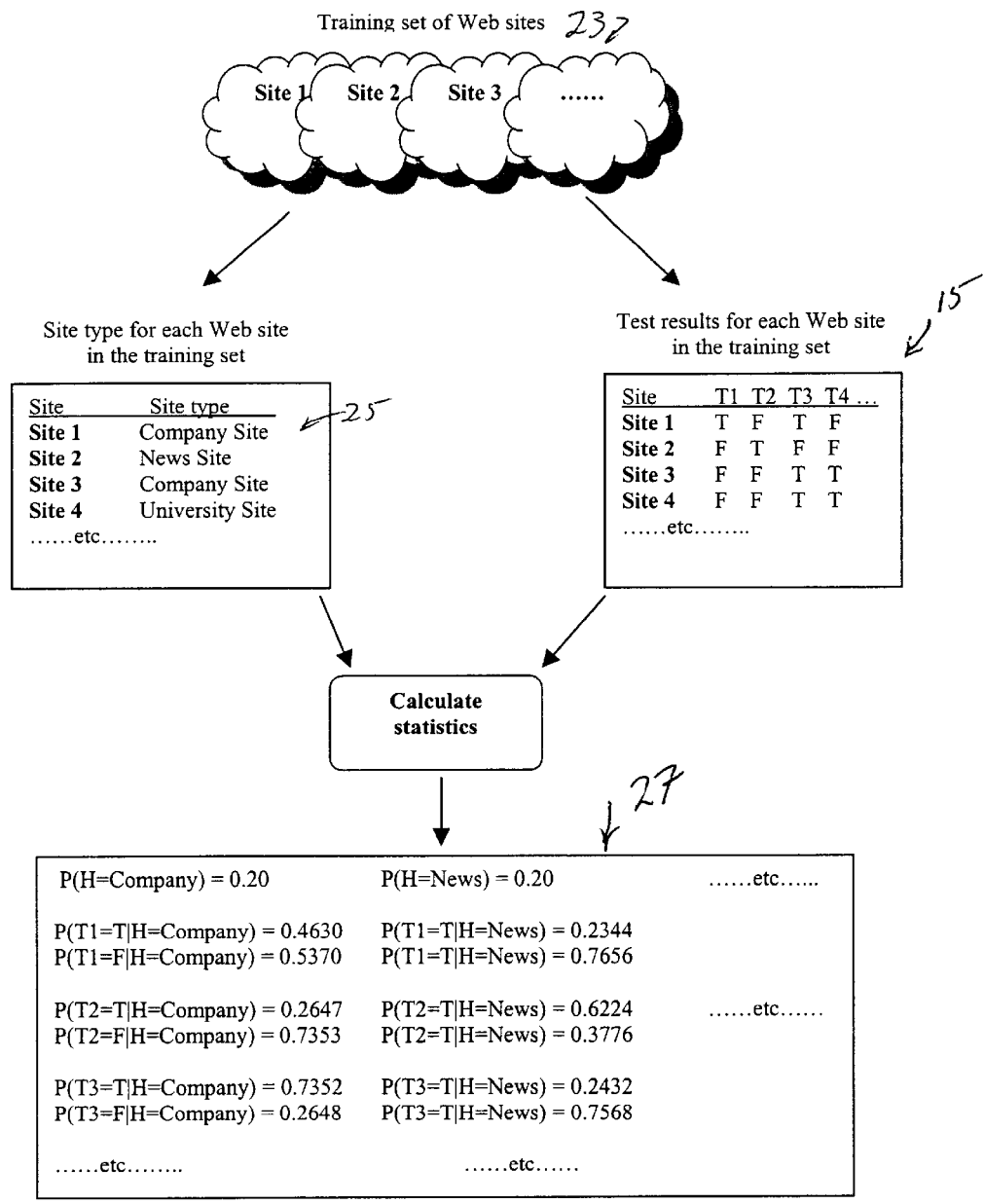
FIG. 2 is a dataflow diagram for the training phase of the present invention.
Figure 3:
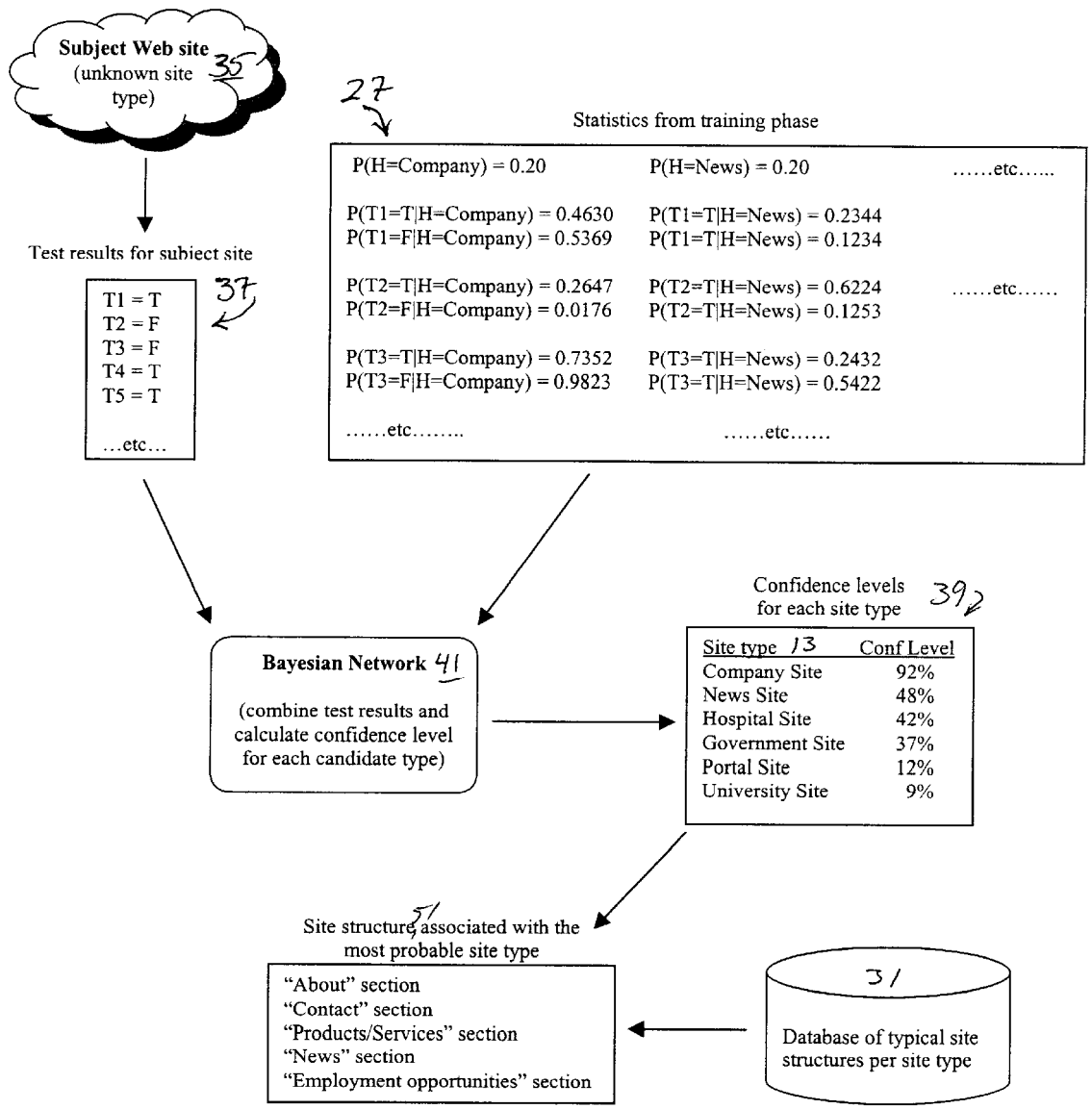
FIG. 3 is an overview of the classification phase of the present invention.

As illustrated in FIGS. 1–3 and further discussed below, the present invention method is formed of a preparation phase or step 11, a training phase 21 and a classification phase 33. In the preparation phase 11 (FIG. 1), the user defines a set of potential site types 13 and a set of tests that provide quantitative measure or evidence about the site type. The set of potential site types 13 may be, for example, the set containing: news site, company site, university site, hospital site, portal site and government site, as illustrated in FIG. 1.

In turn, tests 15 for revealing these potential site types are defined or otherwise provided in the preparation phase 11.

The above discussion presented some properties that could be used to reveal the type of a given site. Each one of those properties can be formulated as a test 15. For example:

Test 1: the text in some of the home page links contains one or more of the keywords {Faculty, Department, School, College}

Test 2: there are more than 5 external links in the home page

Test 3: more than 10% of the site's text is formatted as lists

. . . etc . . .

These tests 15 return a binary outcome, "True" or "False". However, tests 15 that return more than two possible outcomes may also be employed, for example:

Test: the ratio of internal/external links in the site falls in one of the following ranges: A=[0–0.2), B=[0.2, 0.5), C=[0.5, 0.8), D=[0.8, 1.0].

Outcome: A, B, C, D (the corresponding range).

After the tests 15 have been formulated, the training phase 21 utilizes the tests as illustrated in FIG. 2. In training phase 21, the tests 15 are used on a "training" sample of Web sites 23 with known site types to measure the statistical probabilities 27 that a specific test outcome appears given each site type. For example:

Potential site types: {Educational, Company, Other}

Hypothesis (H): Site type is one of the following: {Educational, Company, Other}

Test 1 (T1): Home page links contain one of the keywords {Faculty, Department, School, College}

Test 2 (T2): Home page links contain one of the keywords {About, Contact, Customers, Products, Press Release, Sale}

Test 3 (T3): The number of internal links in the home page falls in one of the following ranges: A=[0–5], B=[6–20], C=[21 or more].

Now the conditional probabilities of every test outcome given each hypothesis is calculated by running the tests on a sample of university Web sites and company Web sites. For example, running the above tests T1, T2 and T3 on a sample of 100 university Web sites and 100 company Web sites may yield the following conditional probabilities:

P(T1=True|H Educational) 0.8
P(T1=False|H=Educational)=0.2
P(T1=True|H=Company)=0.1
P(T1=False|H=Company)=0.9
P(T1=True|H=Other)=0.3
P(T1=False|H=Other)=0.7
P(T2=True|H=Educational)=0.2
P(T2=False|H=Educational)=0.8

P(T2=True|H Company)=0.9
P(T2=False|H=Company)=0.1
P(T2=True|H=Other)=0.4
P(T2=False|H=Other)=0.6
P(T3=A|H=Educational)=0.4
P(T3=B|H=Educational)=0.4
P(T3=C|H=Educational)=0.2
P(T3=A|H=Company)=0.1
P(T3=B|H=Company)=0.3
P(T3=C|H=Company)=0.6
P(T3=A|H=Other)=0.2
P(T3=B|H=Other)=0.4
P(T3=C|H=Other)=0.4

So now when the tests 15 are used on a site of unknown type, each individual test result can be associated with an exact probability of satisfying each hypothesis. That is, the training phase 21 calculated test results 27 on Web sites of known site type are employed to statistically analyze a subject site of unknown type in the classification phase 33 discussed next.

FIG. 3 is illustrative of the preferred classification phase 33. A subject Web site 35 of unknown site type is given. The set of tests 15 (T1 ... T5 ... in FIG. 3) developed and defined in the preparation phase 11 (FIG. 1) is applied to the subject Web site 35. The test results 37 are then quantified according to the corresponding probabilities 27 for the tests 15 calculated in the training phase 21 (FIG. 2).

Next the quantitative test results (probabilities 27) are combined at 41. In the preferred embodiment, a Bayesian network 41 is employed as discussed below. The outcome of the Bayesian network 41 is a confidence level or overall probability 39 for each potential site type 13 (i.e., that the subject Web site 35 is of that potential site type 13). The potential site type 13 with the highest overall probability 39 is deemed to be the site type of the subject Web site 35.

The newly determined site type of subject Web site 35 is used as an index into a database 31, table or other correlation means for cross referencing typical site structure (meta structure) to site type. That is, the database 31 provides an indication of the typical meta structure for a Web site of the given site type. As such, the site structure/meta structure 51 of subject Web site 35 is determined from the site type of highest confidence level 39 calculated by Bayesian network 41. In the preferred embodiment, the method (at 41 in FIG. 3) used to combine these individual probabilities and calculate the overall probability (confidence level) 39 for each hypothesis is as follows.

Bayesian Networks have emerged during the last decade as a powerful decision-making technique. It is a statistical algorithm that can combine the outcome of several tests in order to chain probabilities and produce an optimal decision based on the given test results.

Bayesian Networks come in many forms, however their basic building block is Bayes' theorem:

$$P(A|B) = P(A) \cdot \frac{P(B|A)}{P(B)}$$

One of the simplest types of Bayesian Networks is the Naïve Bayesian Network. The Naïve Bayesian Network is based on the assumption that the tests are conditionally independent which simplifies considerably the calculations. In Naïve Bayesian Networks, the formula that calculates the probability for some hypothesis given some test results is the following:

$$P(H_i|T_1, T_2, \ldots, T_N) = \frac{F_i}{F_1 + F_2 \ldots + F_i + \ldots + F_K}$$

where:

$$F_i = P(H_i) \cdot P(T_1|H_i) \cdot P(T_2|H_i) \cdot \ldots P(T_N|H_i)$$

$H_1, H_2, \ldots, H_K$ are all the possible values of the hypothesis
$T_1, T_2, \ldots, T_N$ are the test results from tests 1, 2, ..., N respectively.

A Naïve Bayesian Network can be used to combine the outcomes from tests on the Web site type. In that case, the multiple values of the hypothesis would be all the potential site types. A straightforward application of the above formula for each hypothesis value would yield a probability (confidence level) for each site type. The highest probability would indicate which is the most probable site type according to the test results.

In some cases, however, the test results do not yield enough "evidence" to determine with sufficient confidence the type of a subject Web site. In those cases, the probabilities calculated for each site type are all below an "acceptable" level. It is useful to define what is "acceptable" by using a threshold value for the confidence levels produced by the present invention. If none of the output confidence levels is above that threshold level, then the conclusion is that the site type is indeterminate. This threshold level can be calculated statistically based on the desired ratio of indeterminates (cases that no site type confidence level is above the threshold) and errors (cases that the incorrect site type is selected).

To summarize, the following steps are involved for selecting automatically the type and structure of a given Web site 35:

A. Preparation
  a) Create the list of Web site types 13 that are to be recognized automatically
  b) Create a set of tests 15 that provide evidence (either "positive" or "negative") about these types 13 based on the contents, format, and structure of a Web site B. Training
  a) Run the tests 15 on a training sample of many Web sites 23 with known site types 25
  b) Collect the test results and calculate conditional probabilities 27 for all combinations of test outcomes and hypothesis values C. Classification
  a) Run the tests 15 on the contents and structure of a given Web site 35
  b) Combine the conditional probabilities 27 for the test results using a suitable technique (e.g. a Bayesian Network 41) to produce a confidence level 39 for each site type 13
  c) Select the site type 13 with the highest confidence level 39

If all confidence levels are below a predetermined threshold, then the site type is considered "indeterminate". In cases that the site type can be safely deduced (the confidence level is above the threshold), then the expected site structure is also deduced based on the structure of the "average", or "typical" site of that type.

Figure 4:
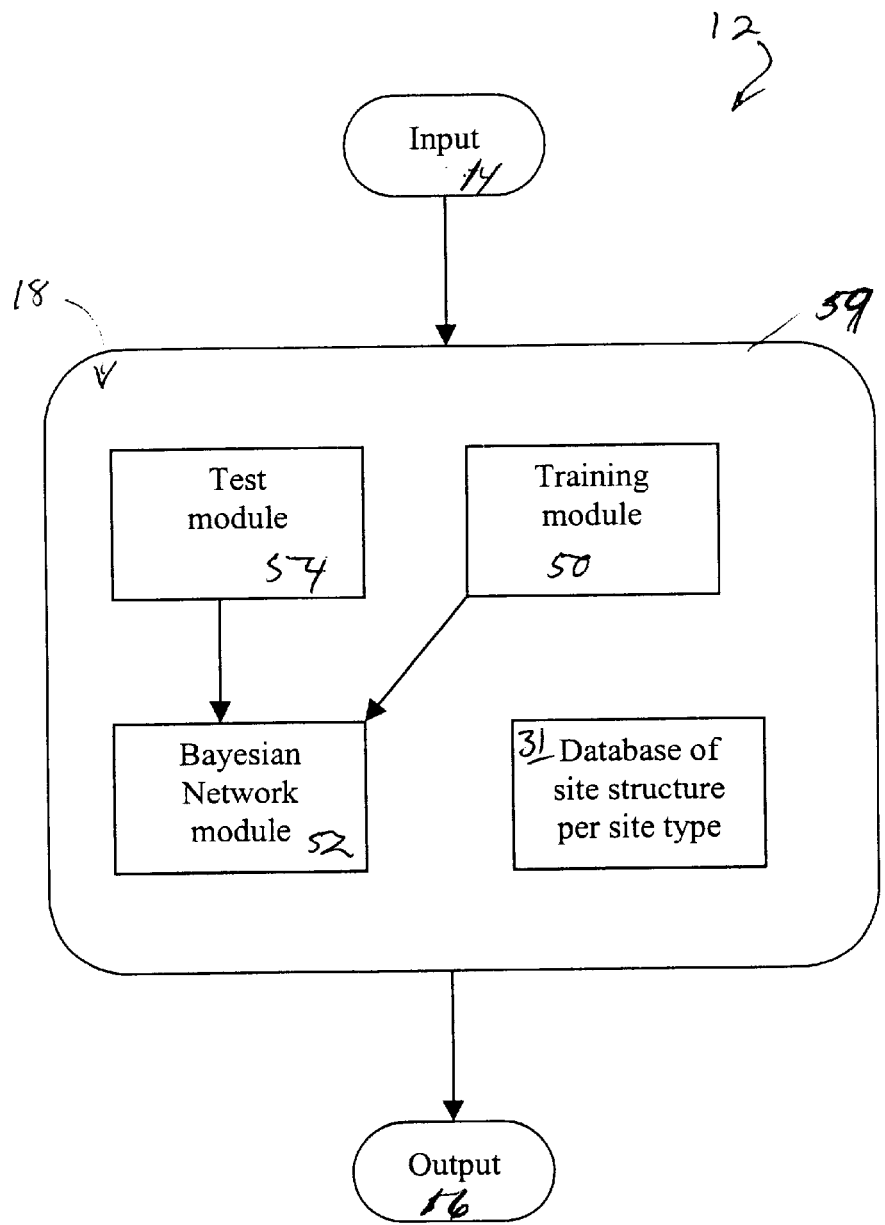
FIG. 4 is a block diagram of a preferred computer embodiment of the present invention.

Illustrated in FIG. 4 is a computer system 12 for implementing the present invention. A digital processor 59 receives input at 14 from input devices (e.g., keyboard, mouse, etc.), a software program, another computer (e.g., over a communications line, the Internet, within an intranet, etc.) and the like. The digital processor 59 provides as output, indications of site type at 16 to output devices (e.g., a display monitor, printer, etc.), software programs, another computer (coupled to processor 59 across a communications link) and the like. In the preferred embodiment, the site types determined by computer system 12 for respective Web sites are output to a database system for storage therein. In particular, the database receives and stores the indications of site types correlated to (or in a cross-referenced manner with) indications of respective Web sites. As such, a database or index of Web sites and corresponding site type is formed by the present invention method and apparatus.

In FIG. 4 digital processor 59 stores or has loaded into its memory the invention software 18. As appropriate, processor 59 executes invention software 18 to implement the present invention as discussed above in FIGS. 1–3. In particular, software routine 18 is formed of a training member/module 50, a Bayesian Network module 52 and a test module 54. The test module 54 performs step A (preparation) above, while training module 50 performs step B (training) above with the support of test module 54. Specifically training module 50 applies the tests 15 of step A above to training set 23 of Web sites with known site types. Next training module 50 calculates conditional probabilities 27 for all combinations of test outcomes and hypothesis values.

The Bayesian Network module 52 implements step C (classification) above as previously discussed in conjunction with FIG. 3. The database 31 provides site structure (meta structure 51) as a function of site type as discussed above.

While this invention has been particularly shown and described with references to preferred embodiments thereof, it will be understood by those skilled in the art that various changes in form and details may be made therein without departing from the scope of the invention encompassed by the appended claims.

Note that there are also other classification techniques and methods/techniques for combining the probabilities 27 for the test results to produce the most appropriate site type; for example, Decision Trees, Neural Networks, rule-based expert systems, etc.

What is claimed is:

1. A method of selecting site type of a subject Web site comprising the computer-implemented steps of:
   providing a predefined set of potential site types for a subject Web site;
   for each potential site type, running tests having test results which enable quantitative evaluation of the potential site type being site type of the subject Web site, the tests including examining at least one of the following:
   number of external links,
   number of internal links,
   distribution of internal and external links among pages,
   morphology of site "tree",
   morphology of the site's text content,
   distribution of multimedia elements in the site;
   mathematically combining the test results; and
   based on the combined test results, selecting one potential site type from the predetermined set as the site type for the subject Web site.

2. A method as claimed in claim 1 wherein the step of combining the test results includes using a Bayesian network.

3. A method as claimed in claim 2 further comprising the step of training the Bayesian network using a training set of Web sites with respective known site type such that statistics on the test results are collected on the training set of Web sites.

4. A method as claimed in claim 1 wherein the step of combining the test results includes producing respective confidence levels of the potential site types, such that the step of selecting selects the potential site type with the highest confidence level as the site type for the subject Web site.

5. A method as claimed in claim 4 wherein the step of selecting the potential site type with the highest confidence level includes determining that the highest confidence level is within a predetermined threshold.

6. A method as claimed in claim 5 wherein the threshold is statistically predefined by a desired ratio of indeterminates to errors.

7. A method as claimed in claim 1 wherein the predefined set of potential site types includes at least one of the following types:
   News provider (e.g. on-line News, magazine, newspaper, newsletter, etc)
   Specialized information provider (e.g. weather, traffic, movies, etc)
   Company, for-profit organization
   Educational institution (e.g. School, University, College, etc)
   Medical organization (e.g. Hospital, Clinic, Health center, etc)
   Law firm
   Religious organization, church
   Non-profit organization
   Professional association
   Political organization
   City level local government
   State level government
   Government organization
   Military
   Retail, catalog
   Portal, directory, search
   Fan club of sports, music stars, movie stars
   Sport team
   Conference, symposium, workshop
   Travel agency, airline
   Sex
   ISP (Internet Service Provider)
   Gaming, sports, outdoors
   Personal
   Hotel, resort
   Entertainment (theater, restaurant, bar, club, etc)
   On-line entertainment (puzzles, jokes, chat rooms, on-line games, etc)
   Reference (dictionaries, thesaurus, yellow pages, places, quotes, etc)
   Job listings, classifieds
   Event (festival, celebration, etc).

8. A method as claimed in claim 7 wherein the step of running tests includes applying tests as a function of potential site type.

9. A method as claimed in claim 1 further comprising the step of, as a function of selected site type for the subject Web site, determining meta structure of the subject Web site.

10. A method as claimed in claim 9 wherein if the selected site type is company, the step of determining meta structure includes determining that the subject Web site has Web pages containing at least one of employment opportunities, press releases, general company information, contact information, products and services information, and management personnel information.

11. A method as claimed in claim 9 wherein if the selected site type is news, the step of determining meta structure includes determining that the subject Web site has Web pages containing at least one of current news, local news, world news, archived news, business news and technology news.

12. A data set formed by the method of claim 1, the data set having indications of plural Web sites and respective site types of the plural Web sites.

13. The method of claim 1 further comprising the step of storing indications of the selected site types per respective Web sites.

14. In a digital processor, computer apparatus for identifying the site type of a subject Web site comprising:
  a predefined set of potential site types for Web sites, and
  a test module utilizing the predefined set and including a plurality of processor-executed tests having test results which enable quantitative evaluation of each potential site type as the site type for the subject Web site, for each potential site type, type test module (i) running at least a subset of the tests, (ii) combining the test results, and (iii) selecting one potential site type as the site type for the subject Web site, The processor-executed tests of the test module including examining at least one of the following:
  number of external links,
  number of internal links,
  distribution of internal and external links among pages,
  morphology of site tree,
  morphology of the site's text content,
  distribution of multimedia elements in the site.

15. Apparatus as claimed in claim 14 wherein the test module combines the test results using a Bayesian network.

16. Apparatus as claimed in claim 15 further comprising a training member for training the Bayesian network using a training set of Web sites with respective known site types such that statistics on the test results are collected on the training set of Web sites.

17. Apparatus claimed in claim 14 wherein the test module produces a respective confidence level for each potential site type, such that the test module selects the potential site type with highest confidence level as the site type for the subject Web site.

18. Apparatus as claimed in claim 17 wherein the test module further determines that the highest confidence level is within a predetermined threshold.

19. Apparatus as claimed in claim 18 wherein the threshold is statistically predefined by a desired ratio of indeterminates to errors.

20. Apparatus as claimed in claim 14 wherein the predefined set of potential site types includes at least one of the following types:
  News provider (e.g. on-line News, magazine, newspaper, newsletter, etc)
  Specialized information provider (e.g. weather, traffic, movies, etc)
  Company, for-profit organization
  Educational institution (e.g. School, University, College, etc)
  Medical organization (e.g. Hospital, Clinic, Health center, etc)
  Law firm
  Religious organization, church
  Non-profit organization
  Professional association
  Political organization
  City or local government
  State government
  Government organization
  Military
  Retail, catalog
  Portal, directory, search
  Fan club of sports, music stars, movie stars
  Sport team
  Conference, symposium, workshop
  Travel agency, airline
  Sex
  ISP (Internet Service Provider)
  Gaming, sports, outdoors
  Personal
  Hotel, resort
  Entertainment (theater, restaurant, bar, club, etc)
  On-line entertainment (puzzles, jokes, chat rooms, on-line games, etc)
  Reference (dictionaries, thesaurus, yellow pages, places, quotes, etc)
  Job listings, classifieds
  Event (festival, celebration, etc).

21. Apparatus as claimed in claim 14 wherein the test module applies only certain ones of the tests depending on the potential site type being tested.

22. Apparatus as claimed in claim 14 wherein each potential site type corresponds to a respective meta structure, such that as a function of selected site type for the subject Web site, the test module further determines meta structure of the subject Web site.

23. Apparatus as claimed in claim 22 wherein if the selected site type is company, then the test module determines that the meta structure of the subject Web site has Web pages containing employment opportunities, general company information, contact information, products and services information, and management personnel information.

24. Apparatus as claimed in claim 22 wherein if the selected site type is news, then the test module determines that the meta structure of the subject Web site has Web pages containing current news, local news, world news, archived news, business news and technology news.

25. Apparatus as claimed in claim 14 further comprising storage means for receiving and storing indications of site types, per respective Web sites, as selected by the test module, such that the storage means provides indications of corresponding site types for respective Web sites.

26. A method of forming an index of Web sites and corresponding site types comprising the computer implemented steps of:
  (a) for each of a subject Web site to be indexed, identifying site type by:
    providing a predefined set of potential site types;
    for each potential site type, running tests having test results which enable quantitative evaluation of the potential site type being site type of the subject Web site, the tests including examining at least one of the following:
number of external links,
number of internal links,
distribution of internal and external links among pages,
morphology of site "tree",
morphology of the site's text content,
distribution of multimedia elements in the site;
mathematically combining the test results; and
based on the combined test results, selecting one potential site type from the predetermined set as the site type for the subject Web site; and (b) storing in a data set indications of the subject Web sites and respective site types as determined by the step of identifying site type, the data set forming an index of Web sites and corresponding site types.

27. A method as claimed in claim 26 wherein the step of identifying site type classifies the subject Web site.

* * * * *

UNITED STATES PATENT AND TRADEMARK OFFICE
CERTIFICATE OF CORRECTION

PATENT NO. : 6,778,986 B1
DATED : August 17, 2005
INVENTOR(S) : Jonathan Stern et al.

It is certified that error appears in the above-identified patent and that said Letters Patent is hereby corrected as shown below:

Column 9,
Line 46, delete "selecting" and insert -- identifying --.
Line 51, after "evaluation" insert -- , including statistical evaluation, --.
Line 59, after "content," insert -- and --.

Column 11,
Line 37, after "content," insert -- and --.

Signed and Sealed this

Sixth Day of September, 2005

JON W. DUDAS
*Director of the United States Patent and Trademark Office*